US006853769B2

(12) United States Patent
McGreer

(10) Patent No.: US 6,853,769 B2
(45) Date of Patent: Feb. 8, 2005

(54) ARRAYED WAVEGUIDE GRATING WITH WAVEGUIDES OF UNEQUAL WIDTHS

(75) Inventor: Kenneth McGreer, Fremont, CA (US)

(73) Assignee: Lightwave Microsystems Corporation, San Jose, CA (US)

(*) Notice: Subject to any disclaimer, the term of this patent is extended or adjusted under 35 U.S.C. 154(b) by 183 days.

(21) Appl. No.: 09/870,876

(22) Filed: May 30, 2001

(65) Prior Publication Data

US 2002/0181868 A1 Dec. 5, 2002

Related U.S. Application Data

(60) Provisional application No. 60/276,779, filed on Mar. 16, 2001.

(51) Int. Cl.[7] ................................................. G02B 6/34
(52) U.S. Cl. ............................ 385/37; 385/39; 385/10
(58) Field of Search ............................ 385/37, 10, 39, 385/16, 18, 27

(56) References Cited

U.S. PATENT DOCUMENTS

| | | | | |
|---|---|---|---|---|
| 4,228,410 A | * | 10/1980 | Goudey et al. | ............. 333/122 |
| 4,423,421 A | * | 12/1983 | Peeler et al. | ................ 343/771 |
| 4,751,711 A | * | 6/1988 | Welch et al. | ................. 372/50 |
| 5,165,001 A | * | 11/1992 | Takagi et al. | ................. 385/42 |
| 5,341,444 A | | 8/1994 | Henry et al. | |
| 5,467,418 A | | 11/1995 | Dragone | |
| 5,623,571 A | | 4/1997 | Chou et al. | |
| 5,745,618 A | | 4/1998 | Li | |
| 5,751,872 A | | 5/1998 | Bissessur et al. | |
| 5,768,450 A | * | 6/1998 | Bhagavatula | ................ 385/24 |
| 5,841,919 A | | 11/1998 | Akiba et al. | |
| 5,901,259 A | | 5/1999 | Ando et al. | |
| 5,930,439 A | | 7/1999 | Ojha et al. | |
| 5,940,555 A | | 8/1999 | Inaba et al. | |
| 5,982,960 A | | 11/1999 | Akiba et al. | |
| 6,137,939 A | | 10/2000 | Henry et al. | |
| 6,181,848 B1 | | 1/2001 | Bruno et al. | |
| 6,205,273 B1 | | 3/2001 | Chen | |

FOREIGN PATENT DOCUMENTS

| | | |
|---|---|---|
| JP | 5-288946 | 11/1993 |
| JP | 7-230012 | 8/1995 |
| JP | 2001-51139 | 2/2001 |
| WO | WO 01/59495 | 8/2001 |

OTHER PUBLICATIONS

Veeburg et al., A low–loss 16–channel polarization dispersion–compensated PHASAR Demultiplexer', IEEE Photonics Technology Letters, vol. 10, n. 3, 3 1998.*

Smit, M.K. et al. (1996). "PHASAR–Based WDM–Devices: Principles, Design, and Applications," *IEEE Journal of Selected Topics in Quantum Electronics* 2(2):236–250.

Inoue, I. et al., (2000). "Novel birefringence compensating AWG design," *Optical Society of America* WB4–1–WB4–3.

(List continued on next page.)

*Primary Examiner*—Frank G. Font
*Assistant Examiner*—K. Cyrus Kianni
(74) *Attorney, Agent, or Firm*—Morrison & Foerster LLP

(57) ABSTRACT

The present invention provides an arrayed waveguide such that each waveguide of the grating has a substantially uniform width, but the width of any single waveguide in the grating is selected based on a predetermined birefringence required for the waveguide. Generally, the narrowest grating waveguide has the longest overall length and the widest grating waveguide has the shortest overall length. The remaining intermediate waveguides have widths that are interpolated between the narrowest and widest waveguide gratings. With an appropriate width for each waveguide, an arrayed waveguide grating is provided that has low polarization dependent wavelength.

20 Claims, 15 Drawing Sheets

OTHER PUBLICATIONS

Kilian, A. et al., (2000). "Birefringence Free Planar Optical Waveguide Made by Flame Hydrolysis Deposition (FHD) Through Tailoring of the Overcladding," *Journal of Lightwave Technology* 18(2): 193–198.

Nadler, C.K. et al. (1999). "Polarization Insensitive, Low-Loss, Low–Crosstalk Wavelength Multiplexer Modules," *IEEE Journal of Selected Topics in Quantum Electronics* 5(5): 1407–1412.

Okamoto, K. (2000). "Ch. 9: Planar Lightwave Circuits," *Fundamentals of Optical Waveguides*. pp. 346–381.

Vreeburg, C.G.M. et al. (1998). "A low–loss 16–channel polarization dispersion–compensated PHASAR demultiplexer," *IEEE Photonics Technology Letters* 10(3): 382–384.

Yamada, H. et al. (2000). "Dispersion Resulting From Phase and Amplutude Errors in Arrayed–Waveguide Grating Multiplexers–Demultiplexers," *Optic Letters* 25(8): 569–571.

* cited by examiner

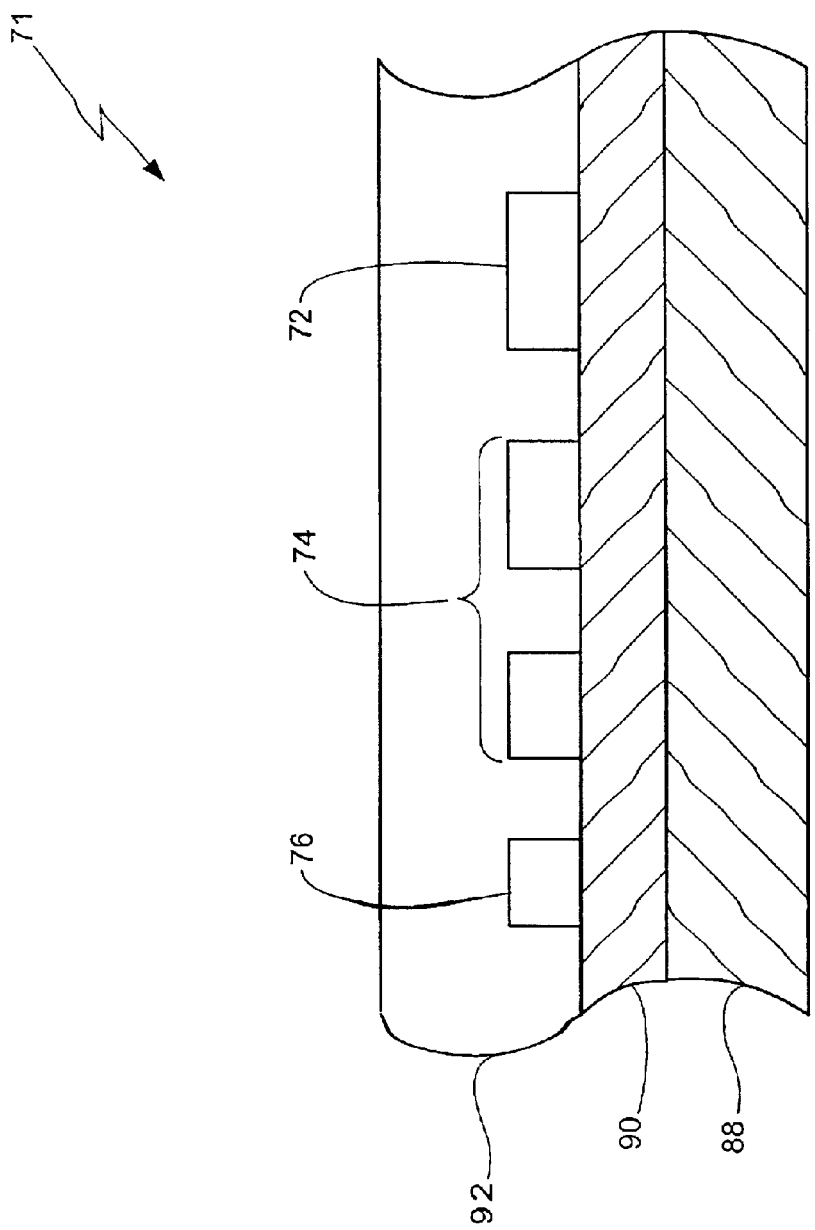

ARRAYED WAVEGUIDE GRATING WITH WAVEGUIDES OF UNEQUAL WIDTHS

CROSS-REFERENCE TO RELATED APPLICATIONS

This application is a conversion and claims the benefit of priority to U.S. Provisional Patent Application Ser. No. 60/276,779, filed on Mar. 16, 2001, which is incorporated herein by reference in its entirety.

FIELD OF THE INVENTION

This invention relates generally to planar lightwave circuits for use in optical signal routing applications, in particular, planar lightwave circuits having arrayed waveguide gratings.

BACKGROUND OF THE INVENTION

The increase in Internet traffic and other telecommunications over the past several years has caused researchers to explore new ways to increase fiber optic network capacity by carrying multiple data signals concurrently through telecommunications lines. To expand fiber network capacity, fairly complex optical components have already been developed for wavelength division multiplexing (WDM) and dense wavelength division multiplexing (DWDM).

In a WDM system, multiple optical data signals of different wavelengths are added together in a device called a multiplexer and the resulting data signal is transmitted over a fiber optic cable. The wavelength division multiplexed signal comprises a plurality of optical signals having a predetermined nominal wavelength difference from each other. A demultiplexer separates the multiple optical data signals of different wavelength. Any WDM system must include at least one component to perform the function of optical multiplexing (namely, the multiplexer) and at least one component to perform the function of optical demultiplexing (namely, the demultiplexer). The optical multiplexer and the optical demultiplexer are each examples of optical wavelength routers.

In general, an optical wavelength router has at least one input optical port and at least one output optical port. In an optical router, light may be transmitted from a specific input port to a specific output port only if the light has an appropriate wavelength. Complex WDM systems may require optical wavelength router components that are more complex than a multiplexer or a demultiplexer.

Planar lightwave circuit technology is one technology that may be used to implement an optical wavelength router. A planar lightwave circuit (PLC) is an application of integrated optics. In a PLC, light is restricted to propagate in a region that is thin (typically between approximately 1 $\mu$m and 30 $\mu$m) in one dimension, referred to herein as the lateral dimension, and extended (typically between 1 mm and 100 mm) in the other two dimensions. The plane in which the PLC is disposed is defined as the plane of the PLC. The longitudinal direction is defined as the direction of propagation of light at any point on the PLC. The lateral direction is defined to be perpendicular to the plane of the PLC. The transverse direction is defined to be perpendicular to both the longitudinal and the lateral directions.

In a typical example of a PLC, a slab waveguide comprises three layers of silica glass, a core layer lying between a top cladding layer and a bottom cladding layer. Channel waveguides are often formed by at least partially removing (typically with an etching process) core material beyond the transverse limits of the channel waveguide and replacing it with at least one layer of side cladding material that has an index of refraction that is lower than that of the core material. The side cladding material is usually the same material as the top cladding material. In this example, each layer is doped in a manner such that the core layer has a higher index of refraction than either the top cladding or bottom cladding. When layers of silica glass are used for the optical layers, the layers are typically deposited on a silicon wafer. Deposition processes may include, chemical vapor deposition (CVD), low pressure chemical vapor deposition (LP-CVD), and/or plasma-enhanced CVD (PECVD). As a second example, slab waveguides and channel waveguides comprise three or more layers of InGaAsP. In this example, adjacent layers have compositions with different percentages of the constituent elements In, P, Ga, and As. As a third example, one or more of the optical layers of the slab waveguide and/or channel waveguide may comprise an optically transparent polymer. In this example, spin coating is one known film deposition method. Another example of a slab waveguide comprises a layer with a graded index such that the region of highest index of refraction is bounded by regions of lower indices of refraction. Graded index structures are commonly formed by dopant in-diffusion and have been used for $LiNbO_3$ waveguides. A doped-silica waveguide is usually preferred because it has a number of attractive properties including low cost, low loss, low birefringence, stability, and compatibility for coupling to fiber.

The arrayed-waveguide grating router (AWGR) is the preferred integrated optical router. An AWGR is a planar lightwave circuit comprising at least one input channel waveguide, an input planar waveguide, an arrayed-waveguide grating (AWG), an output planar waveguide, and at least one output channel waveguide. The edge of the input planar waveguide to which the input channel waveguides are attached is referred to herein as the input focal curve. The edge of the output planar waveguide to which the output channel waveguides are attached is referred to herein as the output focal curve. The arrayed-waveguide grating comprises an array of channel waveguides. The length of the $i^{th}$ waveguide in the AWG is denoted as $L_i$. The angular dispersion that is provided by the AWG is determined in part by the difference in length between adjacent waveguides, $L_{i+1}-L_i$. The details of construction and operation of the AWGR are described in K. Okamoto, *Fundamentals of Optical Waveguides*, pp. 346–381, Academic Press, San Diego, Calif., USA (2000). Each of the publications and patents referred to in this application are herein incorporated by reference in their entirety.

FIG. 1A depicts a conventional AWG router (AWGR) that acts as a demultiplexer 10. A plurality of optical signals incident on one input optical port propagates through the device in the following sequence: the signals propagate through an input waveguide 12, which is a input waveguide associated with the input port; through an input slab waveguide 14, which has the function of expanding the optical field in the transverse direction by diffraction; through the dispersive region 16 (namely, the array waveguide region) comprising an array of AWG waveguides 18 for modifying the direction of propagation for each wavelength constituent according to the wavelength of the constituent of the plurality of signals; through an output slab waveguide 20 for focusing the signals of different wavelength coupled from the dispersive region 16 into a plurality of predetermined positions in accordance with the predetermined wavelength difference; through a plurality of output waveguides 22 each associated with one output port. FIG. 1A depicts an AWG comprising six waveguide; however, any number of waveguides may be used and herein the number of waveguides used is referred to as "N." A representative cross-section 30, section 1B—1B, of waveguide gratings 16 from FIG. 1A is shown in FIG. 1B. Depicted are the substrate 34, the bottom cladding 36, the top cladding 38, and waveguides comprising core material 31, 32, 33. These waveguides are typically buried channel waveguides as shown and typically have a core region with uniform height and width as seen in first, intermediate, and $N^{th}$ waveguides 31, 32, 33, respectively. That is, the height of each waveguide of the grating is identical and the width of each waveguide of the grating is identical.

The dispersive property of the arrayed waveguide grating (AWG) region is attributable to the construction of the plurality of waveguides within the waveguide grating region such that adjacent waveguides have a predetermined length difference in accordance to the required dispersive properties of the dispersive region 16, so that each signal at different wavelength coupled to and traveling over each channel waveguide 18 is provided with a phase difference from each other in accordance with the predetermined length difference. Each of the output waveguides 22 includes an input end 24, which is arranged at a predetermined position, so that each separated signal at each wavelength is coupled to each output waveguide 22 and emerges from an output end 26 thereof.

In operation, the wavelength division multiplexed signals coupled into the input channel waveguide 12 expand into the input slab waveguide 14 by diffraction. Then, the expanded signals are distributed to the channel waveguides 18 of the arrayed-waveguide grating 16. Because each channel waveguide 18 of the arrayed-waveguide grating 16 has a predetermined waveguide length difference, each signal, after traveling over each channel waveguide 18 to the output slab waveguide 20, has a predetermined phase difference according to its waveguide length difference. Since the phase difference depends on the wavelength of the signal, each signal at different wavelength is focused on a different position along the arc boundary 28 of the output slab waveguide 20. As a result, separated signals, each having a different wavelength, are received by the plurality of output channel waveguides 22 and emerge therefrom, respectively.

The general principles and performance of an AWGR multiplexer are similar to the AWGR demultiplexer, except that the direction of propagation of light is reversed, the ports that act as inputs for the demultiplexer act as output ports for the multiplexer, and the ports that act as output ports for the demultiplexer act as input ports for the multiplexer.

Alternatively, an AWGR may comprise a plurality of output waveguides and a plurality of input waveguides; however, the general principles and performance are similar to the AWGR demultiplexer Multiple routing functions including multiplexing and demultiplexing may be integrated on a silicon wafer to form a complex planar lightwave circuit (PLC). PLCs can be made using tools and techniques developed to extremely high levels by the semiconductor industry. Integrating multiple components on a PLC may reduce the manufacturing, packaging, and assembly costs per function.

One aspect of performance that is affected by the present invention is referred to as polarization dependent wavelength (PDW). This term, as well as a number of related terms, will now be defined. Spectral transmissivity (in units of dB) is defined as the optical power (in units of dBm) of substantially monochromatic light that emerges from the fiber that is coupled to the input port minus the optical power (in units of dBm) of the light that enters the optical fiber that is coupled to the output port of the optical router. Spectral transmissivity is a function of the selected input port, the selected output port, the optical wavelength, and the polarization state of the incident light. When the incident light is in a polarization state called a "principle state of polarization," the light will be in the same polarization state when it emerges from the device. For purposes of illustration only, the principle states of polarization are assumed to be independent of wavelength, input port and output port. It is understood that the invention is not so limited by this assumption. Again, for the purposes of illustration only, it will be assumed that the two principle states of polarization are the so-called transverse electric (TE) and transverse magnetic (TM) polarization states. The TE polarization state has an electric field that is predominantly aligned in the transverse direction and the TM polarization state has an electric field that is predominantly aligned in the lateral direction. Again, the invention is not so limited to devices having these principle states of polarization. Typically, the device performance is sensitive to the polarization state of the incident light is attributable to birefringence in the planar waveguides and the channels waveguides comprising the AWGR.

FIG. 2A depicts, for a particular input/output port combination, a first spectral transmissivity 40 associated with the TE polarization state and a second spectral transmissivity 42 associated with the TM polarization state. Typically, for values of spectral transmissivity that are larger than −10 dB, the TM spectral transmissivity is a replica of the TE spectral transmissivity that is shifted in wavelength by an amount that is referred to as the polarization dependent dispersion (PDD). Herein PDD is positive if the TM spectral transmissivity has a maximum that has a longer wavelength than the maximum of the TE spectral transmissivity and is negative otherwise. Polarization dependent wavelength (PDW) is defined herein as the absolute value of the PDD and is indicated in FIG. 2A. The curves for the spectral transmissivity 46, 48, 50, 52 for four input/output combinations are shown together in FIG. 2C. The absolute value of the difference between the spectral transmissivities for TE and TM polarization states is referred to as the spectral polarization dependent loss 44 and is depicted in FIG. 2B. The in-band PDL (IB-PDL) is the maximum value of the spectral polarization dependent loss within a specified wavelength range called a "band" (typically a 0.2 nm range) for a particular input port and output port. The PDL for the device is typically defined as the largest value of IB-PDL among the values of IB-PDL for all input/output port combinations that are used in a particular application. To meet typical application requirements, it is critical for AWGRs to have a PDL value that is as close to 0 dB as possible.

In typical fiber optic communication systems, the polarization state of the light in the optical fiber may change in a manner that is uncontrolled and unpredictable. A change in the polarization state of the light in the fiber as it enters an AWGR will cause a change in the optical power that emerges from the AWGR that may be as large as the value of PDL for the AWGR. Because applications typically have little tolerance for such unpredictable changes in power, minimizing the PDL of an AWGR is highly desirable. PDL can be minimized by minimizing PDW. To meet typical requirements, PDW may be required to be less than 0.05 nm. For this reason, the design and manufacture of an AWGR that has a low value of PDW is highly desirable, yet very challenging.

There have been a number of techniques developed in an attempt to minimize PDW.

One approach to minimizing PDW involves selecting an optical layer design with minimum birefringence. In one example of this approach, U.S. Pat. No. 5,930,439 (Ojha et al) discloses a planar optical waveguide which reduces birefringence by doping the various optical layers so that the top cladding has a thermal coefficient of expansion that is close to the thermal expansion coefficient of the substrate. This approach is appropriate for an optical layer design comprising deposited silica layers with high concentrations of boron on a silicon substrate. Typically, this approach is impractical because the optical layers that are required for low birefringence are not capable of surviving standard reliability tests. For example, the optical layers may absorb water and subsequently form defects during a reliability test involving exposure to a temperature of 85° C. and a relative humidity of 85%, A second approach requires the introduction of an optical waveplate. For example, U.S. Pat. No. 5,901,259 (Ando et al.) teaches forming an optical waveplate by using a polyimide having a film thickness of 20 μm or smaller and further teaches the introduction of the waveplate onto an AWGR to reduce PDW. However, introducing a waveplate onto the AWGR typically reduces the performance of the AWGR with respect to insertion loss, directivity, and return loss and occasionally may cause the AWGR to break. Furthermore, the introduction of a waveplate increases the cost associated with the production of the AWGR.

A third approach to reducing PDW involves waveguides of the AWG that comprise three segments, a central segment and two flanking segments. A first flanking segment has a birefringence equal to that to the second flanking segment. The central segment has a birefringence that is different from the flanking segments. The boundary around the central waveguide segments defines a region that is referred to herein as a "patch." By selecting lengths of the segments that are appropriate to values of birefringence of the segments, an AWGR can be realized with a small value for PDW. A variety of methods have been disclosed for providing for segments with differing values of birefringence. For example, C. G. M. Vreeburg, et al. in "A low-loss 16-channel polarization dispersion-compensated PHASAR demultiplexer," IEEE Photonics Technology Letters, Vol. 10, No. 3, Pp. 382–384 (1998) discloses a method wherein the AWG comprises InP-based rib waveguides, and the central segment differs from the flanking segments with respect to width of the rib and thickness of the top cladding region above the rib. In general, waveguides may have birefringence contributions from two independent sources, namely, form birefringence and stress birefringence. For rib waveguides, changing the width of the waveguide changes the form birefringence but does not substantially change the stress birefringence. For buried channel waveguide, changing the width of the waveguide does not substantially change the form birefringence. The effect of the width of a buried channel waveguide on the value of stress birefringence in the waveguide is not well known in the prior art.

In a second example, U.S. Pat. No. 5,341,444 (Henry et al.) discloses a method that includes the deposition of a high index material, such as silicon nitride, in the patch region so that it is optically coupled to the waveguide segments below it and thereby provides the central segments with a birefringence that is different from the birefringence of the flanking segments.

In a third example, U.S. Pat. No. 5,623,571 (Chou et al.) discloses a method that includes reducing the thickness of the cladding material in the patch region so that waveguide segments below couple to the air above the top cladding in the patch region and thereby provide the central segments with a birefringence that is different from the birefringence of the flanking segments.

In a fourth example, C. K. Nadler et al. in "Polarization Insensitive, Low-Loss, Low-Crosstalk Wavelength Multiplexer Modules," IEEE Journal of Selected Topics in Quantum Electronics, Vol. 5, No. 5, pp. 1407–1412 (1999), discloses a method for compensating polarization sensitivity of AWGs by using "stress release" grooves etched on each side of the grating waveguide in the central region.

In all of these examples of this approach, extra process steps are required to provide the waveguide segments within the patch region with a birefringence that is different from the flanking waveguide segments. The disclosed methods are difficult to implement in practice because production of the required optical layers within the patch region within the required tolerances is difficult. The added complexity associated with the production of two different optical layer designs in two different regions also increases the cost of production. Despite the approaches above, PDW remains a problem in current AWGR designs.

SUMMARY OF THE INVENTION

The present invention provides an arrayed waveguide grating with waveguides of unequal widths. Described herein is an arrayed waveguide grating where each waveguide of the grating preferably has a substantially uniform width, but the width of any single waveguide in the grating may be selected based on a predetermined birefringence preferably required for the waveguide. Generally, the narrowest grating waveguide preferably has the longest overall length and the widest grating waveguide preferably has the shortest overall length. The remaining intermediate waveguides have widths that may be interpolated between the narrowest and widest waveguide gratings. With an appropriate width for each waveguide, an arrayed waveguide grating may be provided having a low polarization dependent wavelength.

Alternative waveguides with variable widths may also be incorporated. For example, waveguides having two segments with different widths may be utilized. Alternatively, waveguides having tapered ends may also be utilized; and waveguides that taper in an arc-like pattern may also be utilized depending upon the desired results.

BRIEF DESCRIPTION OF THE DRAWINGS

FIG. 3B depicts a cross-section from 3B—3B of FIG.. 3A showing the grating waveguides with unequal widths.

DETAILED DESCRIPTION OF THE INVENTION

Figure 1A:
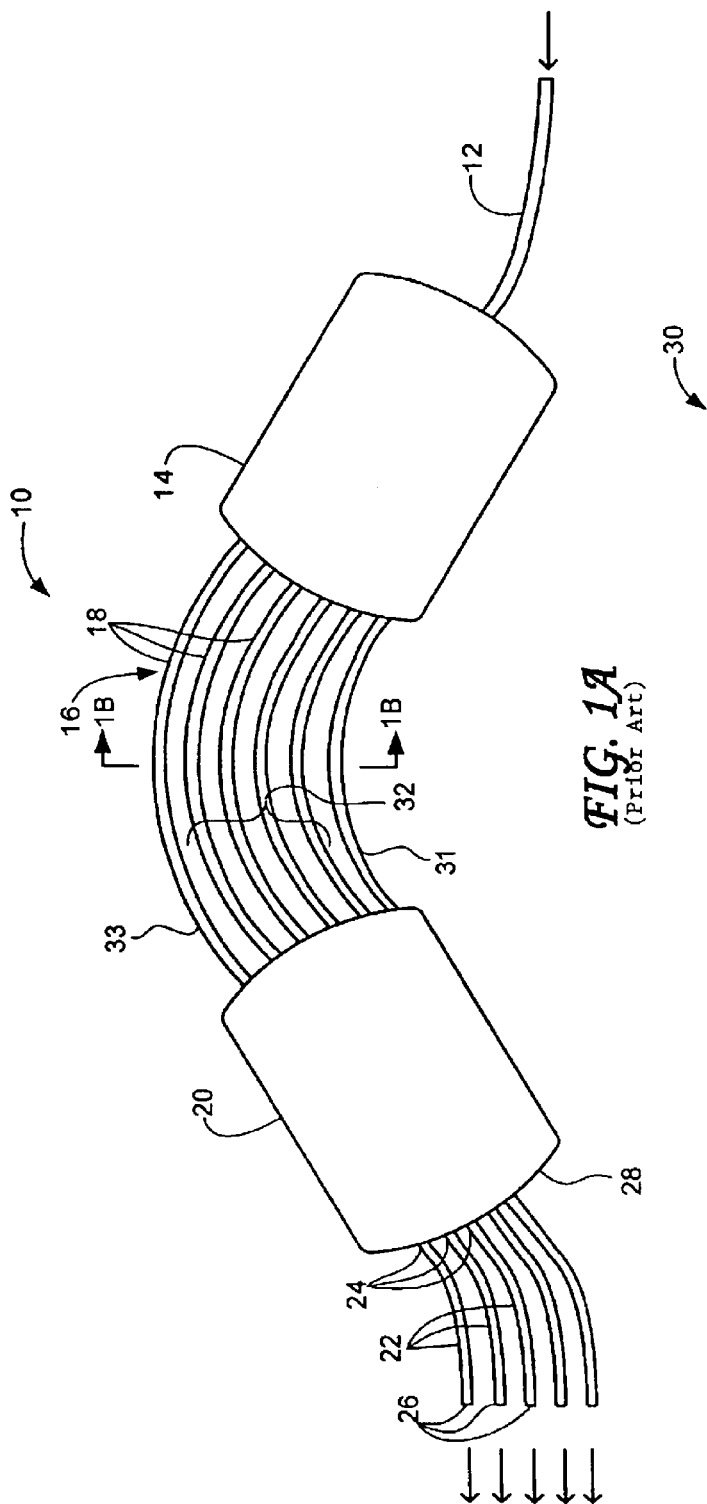
FIG. 1A schematically depicts a conventional AWG with waveguides of uniform width.
Figure 1B:
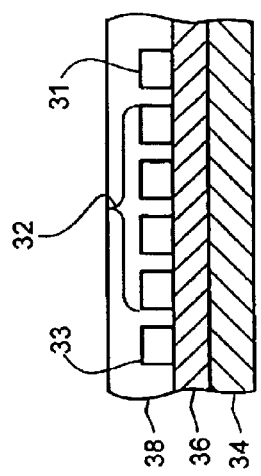
FIG. 1B depicts a cross-section from FIG.. 1A showing the waveguide widths.
Figure 2A:
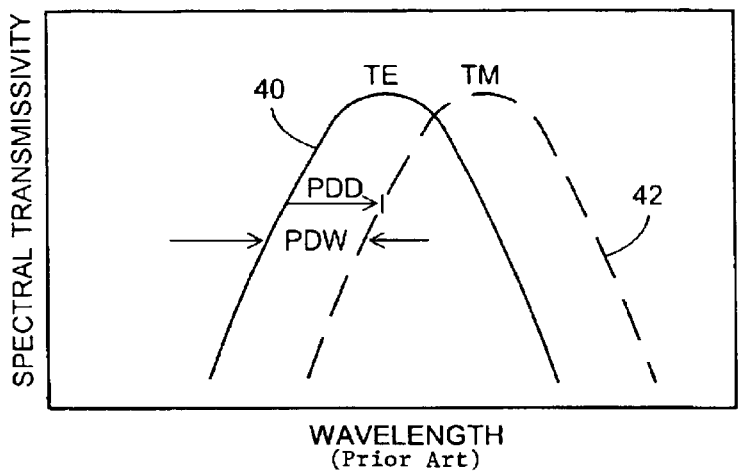
FIG. 2A schematically depicts the spectral transmissivity for a particular input/output port combination of an AWGR. The spectral transmissivity for the TE and TM polarizations are illustrated. The polarization dependent wavelength (PDW) is indicated on the Fig.
Figure 2B:
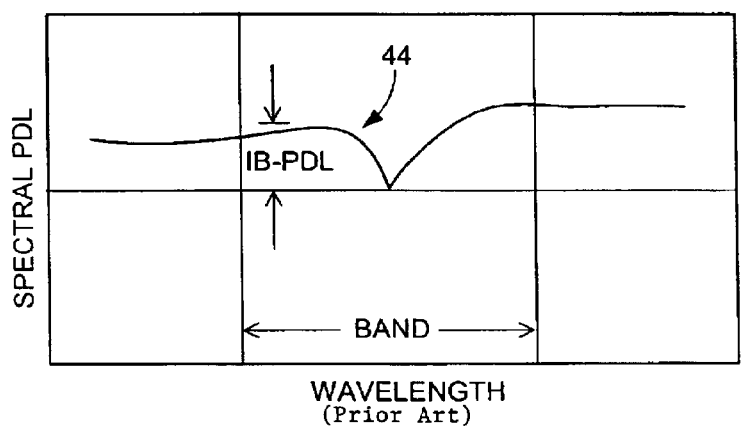
FIG. 2B schematically depicts the spectral polarization dependent loss (PDL) and the in-band PDL.
Figure 2C:
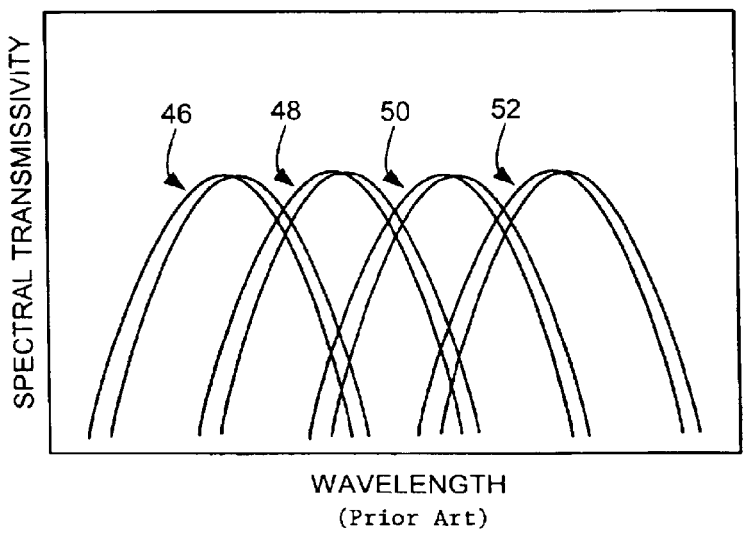
FIG. 2C schematically depicts the spectral transmissivities for a single input port and four different output ports.
Figure 3A:
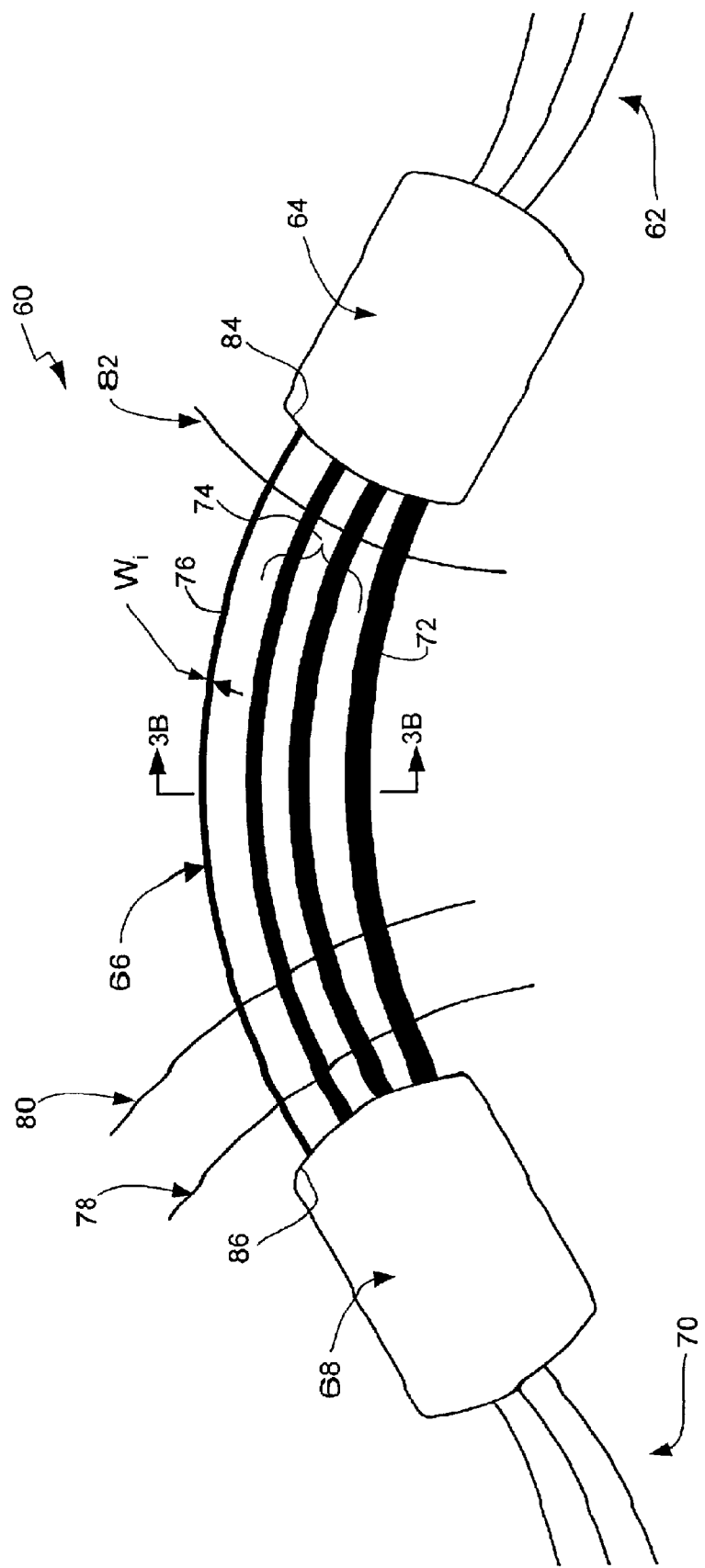
FIG. 3A schematically depicts a variation of an AWGR. In this variation, the width of each waveguide is independent of the distance along the waveguide.

Turning now to the drawings and referring initially to FIG. 3A, there is depicted one variation of the inventive AWGR 60. AWGR 60 may comprise at least one input waveguide 62, an input planar waveguide 64, an arrayed waveguide grating (AWG) 66, an output planar waveguide 68, and at least one output waveguide 70. An AWGR that operates as a demultiplexer may require a plurality of output waveguides 70 and an AWGR that operates as a multiplexer may require a plurality of input waveguides 62. The AWG may comprise a plurality of waveguides 66. An arbitrary number of curved surfaces, herein referred to as "normal surfaces" may be defined such that all waveguides of the AWG intersect the normal surfaces at normal incidence, i.e., such that the angle between the waveguide and the normal surface is about 90°. Representative examples of normal surfaces are depicted as 78, 80, 82. A view of the AWGR in the normal surface is a cross-section view. In the present invention, the location where the AWG intersects at least one normal surface, at least one of the waveguides of the AWG preferably has a birefringence value that is different from the birefringence value from at least one other waveguide of the AWG. In this context, "birefringence value" refers to the birefringence value of the fundamental guided mode of the waveguide. The birefringence values of the waveguides are significant because PDW of the AWG depends on the birefringence values of the waveguides.

For a typical channel waveguide, the birefringence value is a function of the refractive indices of the materials that comprise the waveguide and the dimensions and shapes of various regions that comprise the waveguide. As an example, detailed discussion is provided for the variation in which the waveguides comprise three materials, namely the core material, the bottom cladding material, and the top cladding material, each with a refractive index that is uniform throughout the material. However, the invention is not so limited, and may apply, for example, to waveguides that comprise any number of materials, each with a uniform refractive index, or alternatively, it may apply to graded index waveguides. It is preferred that the difference in birefringence values of different waveguides of the AWG may be attributable to differences in the shape and dimensions of the core regions of the waveguides. It is preferably that at least one of the waveguides of the AWG differs in cross-section from at least one other waveguide of the AWG.

Figure 4A:
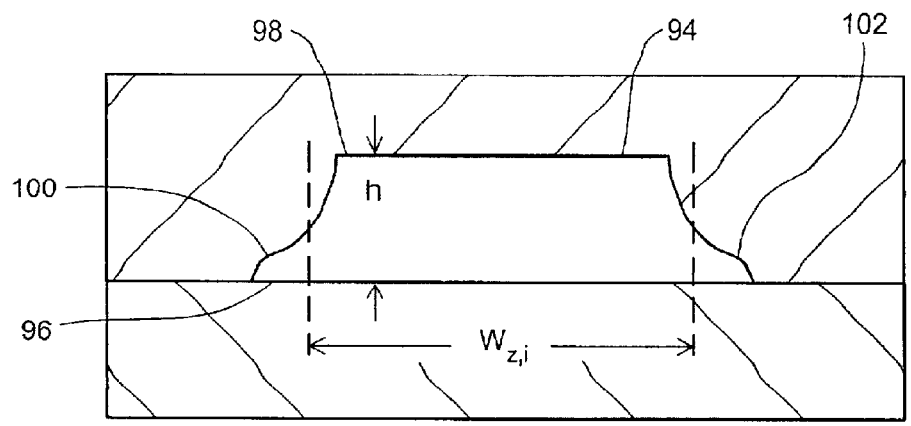
FIG. 4A schematically depicts a cross-section view of a buried channel waveguide comprising parallel top and bottom surfaces, and side surfaces that are not flat.

For a typical buried channel waveguide, as illustrated in FIG. 4A, the core 94 has a shape such that it comprises a bottom surface 96 that is substantially flat, a top surface 98 that is substantially flat and substantially parallel to the bottom surface, and two side surfaces 100, 102. The distance between the top surface of the core region and the bottom surface of the core region is referred to herein as the height, h, of the waveguide at a particular cross-section. When referring to a buried channel waveguide, the cross-sectional area of the core region of the waveguide divided by the height of the waveguide at a particular cross-section is referred to herein as the width of the waveguide.

Figure 4B:
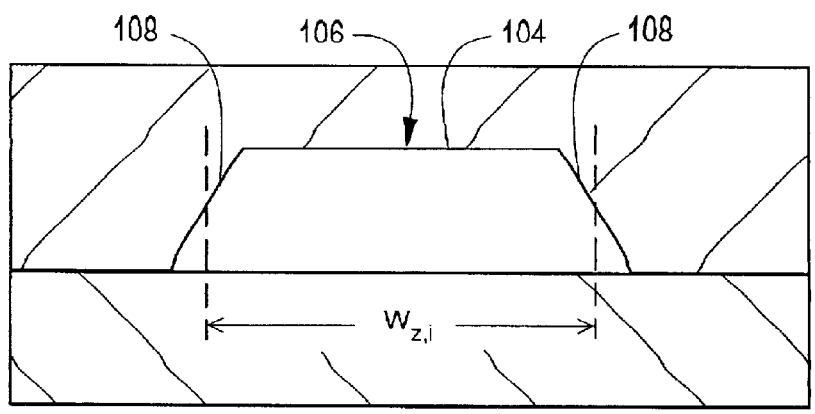
FIG. 4B schematically depicts a cross-section view of a buried channel waveguide comprising parallel top and bottom surfaces, and flat side surfaces that are not parallel.
Figure 4C:
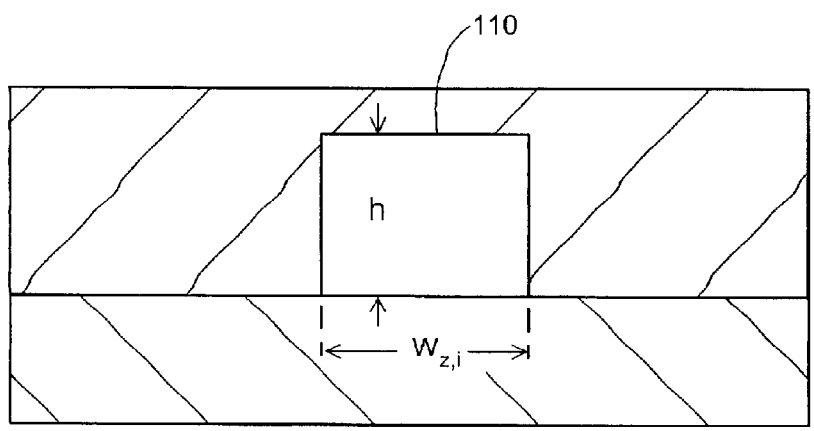
FIG. 4C schematically depicts a cross-section view of a buried channel waveguide that has a substantially rectangular cross-section.
Figure 5:
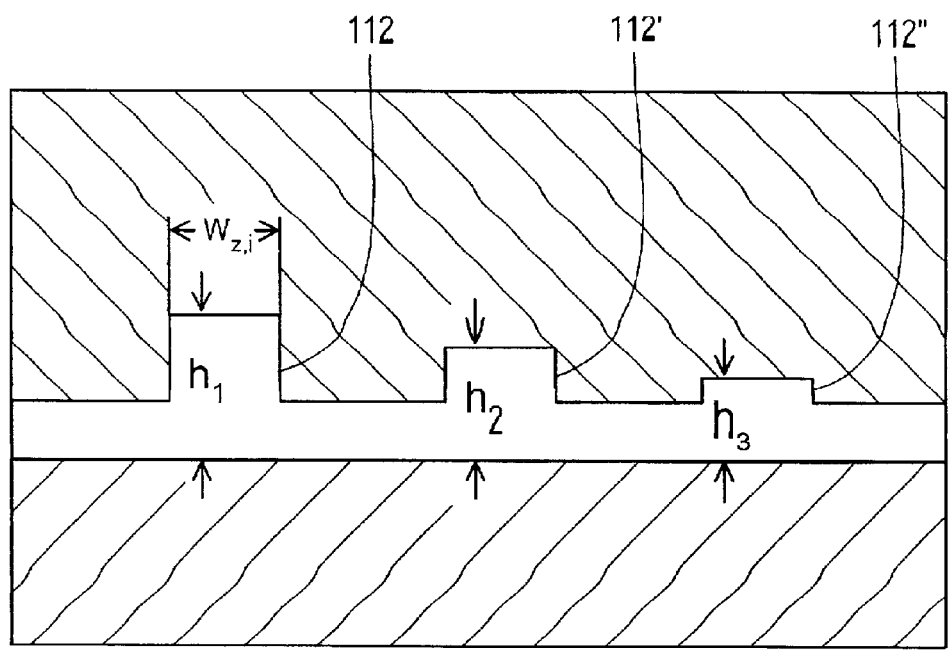
FIG. 5 schematically depicts a cross-section view of a rib waveguide.

FIG. 4B depicts a buried channel waveguide 104 comprising a core region 106 with flat sides 108 and FIG. 4C, depicts a buried channel waveguide 110 with a substantially rectangular cross-section. Although it is preferred that the AWG waveguides comprise buried channel waveguides, the invention is not so limited and the AWG waveguides may comprise other waveguide types, for example, the AWG waveguides may comprise rib waveguides 112, 112', 112" where each waveguide 112, 112', 112" may have a different corresponding height, $h_1$, $h_2$, $h_3$, respectively, as depicted in FIG. 5. In at least one cross-section view, at least one of the waveguides of the AWG may preferably differ in width from at least one other waveguide of the AWG. Providing the at least one waveguide with a birefringence value that is different from at least one other waveguide by providing the respective waveguides with appropriate widths is preferred; however, it is also possible to produce waveguides having different heights or different refractive indices in accordance with the principles disclosed herein by, e.g., masking some but not all of the waveguides of the grating such that each waveguide is exposed to different etch conditions or dopant diffusion conditions to provide waveguide cores of different heights, as shown in FIG. 5, or refractive index values respectively.

In one variation, at least one of the waveguides of the AWG has an average width that preferably differs from the average width of at least one other waveguide of the AWG. In this context, "average width" refers to the average taken over a substantial portion of length of the waveguide and is defined more clearly in the text and mathematical expressions that follow. As shown in FIG. 3A, the longest waveguide 76 is preferably the narrowest relative to the other waveguides in grating 66. It is further preferred for the core to be substantially rectangular in the cross-section view, as illustrated in FIG. 3B. A representative cross-section 71, section 3B—3B, of waveguide gratings 10 from FIG. 3A is shown in FIG. 3B. There the waveguides are depicted with unequal widths, as seen in first, intermediate, and $N^{th}$ waveguides 72, 74, 76, respectively. Also depicted are substrate 88, bottom cladding 90, and top cladding 92 in which waveguides 72, 74, 76 are disposed. Again as shown in this variation, the longest waveguide 76 is preferably the narrowest relative to the other waveguides in grating 74 and 76. And waveguide 72 is preferably the widest waveguide. Intermediate waveguides 74 may each have a width that progressively becomes narrower with each adjacent waveguide from widest waveguide 72 to narrowest waveguide 76. This variation depicts AWGR 60 having four waveguides in grating 66, but the number of waveguides here is merely exemplary and any number of waveguides may be utilized in practice. Likewise, any number of waveguides may be used such that the principles set forth herein may be applied. AWG as shown in FIGS. 3A and 3B may be manufactured by any number of conventional methods as discussed below.

As generally set forth, a method of controlling birefringence in, e.g, an arrayed waveguide grating, in accordance with the present invention may comprise first transmitting a signal, e.g., a light signal, into the input end of a first waveguide which may have a constant width and a certain length. The signal may also be transmitted into at least a second waveguide which preferably has a width narrower than the width of the first waveguide and a length longer than the length of the first waveguide. As the number of waveguides increase, their corresponding widths preferably decrease and corresponding lengths preferably increase in accordance with the principles discussed herein.

As discussed above, in making waveguide gratings of variable widths, any number of manufacturing methods may be utilized. Producing, e.g., multiplexers and demultiplexers, may be integrated on, e.g., a silicon wafer to form a complex PLC. PLCs may be made using the tools and techniques developed to extremely high levels by the semiconductor industry.

In a typical embodiment, as shown in FIG. 3A, the slab waveguides 14 and 20 may be comprised of at least three layers of doped silica deposited on a silicon wafer, namely, a bottom cladding layer that is approximately 5 $\mu$m to approximately 50 $\mu$m thick, a core layer that is approximately 5 $\mu$m to approximately 12 $\mu$m thick and a top cladding layer that is approximately 5 $\mu$m to approximately 50 $\mu$m thick. In a typical variation the core layer may have a refractive index that is larger than the refractive index of the bottom cladding between approximately 0.02 and 0.2 and the refractive index of the bottom cladding is between approximately 1.4 and 2.2 as measured in the wavelength range between about 1520 nm and about 1600 nm. However, the invention is not so limited and may be applied to, e.g., integrated optical routers comprising waveguides that are comprised of other materials such as InGaAsP, silicon, LiNbO$_3$, or polymer. Furthermore, the slab waveguide may comprise more than three optical layers or may comprise a graded index layer. It is preferably that the input/output slab waveguides and/or the input/output waveguides are single mode waveguides, i.e., only the fundamental mode is guided by the waveguide.

The theory related the polarization dependence as it applies to a conventional AWGR and as it applies to the present invention is presented below. The spectral transmissivity I depends on T, which is the transfer function associated with the propagation of light from a first curve, referred to herein at the "curve A" to a second curve, referred to herein as the "curve B." At least some part of the AWG is preferably between curve A and curve B. A representative example of curve A is shown as 82 in FIG. 3A and a representative example of curve B is shown as 78. In a second example, curve A 84 may be located at the interface between the AWG 66 and the input planar waveguide 64, and curve B may be located at the interface between the AWG 66 and the output planar waveguide 68. An expression for the transfer function is given by H. Yamada, K. Okamoto, A. Kaneko, and A. Sugita, *Dispersion Resulting From Phase And Amplitude Errors In Arrayed-Waveguide Grating Multiplexers-Demultiplexers*, Optics Letters, vol. 25, no. 8, pp. 569–571 (2000). Accordingly, transfer function may be given by $$T = \sum_{i=1}^{N} a_i \exp(j\phi_i)\exp(jk_0 OPL_i) \quad (1)$$

where N is the number of waveguides in the AWG and OPL$_i$ is the optical path length along the ith waveguide of the AWG between curve A and curve B; k$_0$ is the value of $2\pi/\lambda$, where $\lambda$ is the wavelength of the light in vacuum that enters the input port of the AWGR; a$_i$ and $\phi_i$ are real numbers that are determined in part on which input port and output port are being used and also determined in part by how light propagates from the input port of the AWGR to curve A. Variables a$_i$ and $\phi_i$ may further be determined in part by how light would propagate from the output port to curve B if the direction of propagation of light were reversed with respect to the intended application. To simplify further discussion, it may be assumed that curve A and curve B are circular arcs. It may further be assumed that the input waveguide couples light into the input planar waveguide at a location that is centered on a point that is the center of curvature of curve A. It may further be assumed that the output waveguide couples light from the output planar waveguide at a location that is centered on a point that is the center of curvature of curve B. For an ideal Gaussian AWGR, $\phi_i$ has the same value for all waveguides of the AWG, i.e., $\phi_i$ is independent of i. The relationship between I and T is $$I=TT^*, \quad (2)$$

where T* is the complex conjugate of T.

Generally in Eq. 1, a$_i$, $\phi_i$ and OPL$_i$ are dependent on the polarization of light. To simplify further discussion, as may be assumed to be independent of polarization; however, the invention is not limited to this assumption. Referring to the principle states of polarization as TE and TM, we may associate $\phi_i^{TE}$, $\phi_i^{TM}$, OPL$_i^{TE}$ and OPL$_i^{TM}$ with the values of $\phi_l$ and OPL$_i$ for the TE and TM polarization states, respectively. Eqs. 1 and 2 indicate that I may have the same value for both polarizations of light (i.e. the AWGR will have zero PDW) if $$OPL_i^{TE}+\phi_i^{TE}=OPL_i^{TM}+\phi_i^{TM}+\delta \quad (3)$$

where $\delta$ is an arbitrary constant. The value of $\delta$ has no effect on I; it may be only important for $\delta$ to be independent of i. Equation 3 may be expressed in the alternative form $$\Delta OPL_i^{TE} = \Delta OPL_i^{TM} + \Phi_i \tag{4a}$$

where $$\Delta OPL_i^{TE} = OPL_{i+1}^{TE} - OPL_i^{TE} \tag{4b}$$

$$\Delta OPL_i^{TM} = OPL_{i+1}^{TM} - OPL_i^{TM} \tag{4c}$$

$$\Phi_i = \phi_{i+1}^{TM} - \phi_i^{TM} - \phi_{i+1}^{TE} + \phi_i^{TE} \tag{4d}$$

Eq. 4 is the criterion for zero PDW. It is preferred that, $\Phi_i = 0$; however, the invention is not so limited. The requirement expressed by Eq. 4 depends only on the difference in OPL between adjacent waveguides of the AWG. Consequently, the criterion for zero PDW (i.e., Eq. 4) may be satisfied even if the evaluation of OPL values expressed in equation 4 for any waveguide segment excludes a segment of each waveguide, provided that the each excluded segment has the same OPL. For example, the input tapers that couple light from the input planar waveguide may be excluded from the evaluation of OPL for each waveguide without affecting the interpretation of Eq. 4. In general OPL may be expressed by the equation $$OPL_i^{TE} = n_i^{TE} l_i$$

$$OPL_i^{TM} = n_i^{TM} l_i \tag{5}$$

where $n_i^{TE}$ and $n_i^{TM}$ refer to the values of the effective index of the fundamental mode of the waveguide averaged along the waveguide between curve A and curve B for TE and TM polarized light respectively. Mathematically, $n_i^{TE}$ and $n_i^{TM}$ may be expressed as $$n_i^{TE} L_i = \int_0^{L_i} n_{z,i}^{TE} dz_i \tag{6}$$

$$n_i^{TM} L_i = \int_0^{L_i} n_{z,i}^{TM} dz_i$$

where $n_{z,i}^{TE}$ and $n_{z,i}^{TM}$ are the effective indices at a distance z along the waveguide from curve A towards curve B for the TE and TM polarizations respectively. Applying equations 5 and 6, equation 4 may be expressed as $$L_i \Delta B_i + B_i \Delta L_i = \Phi_i \tag{7}$$

where $\Delta L_i = L_{i+1} - L_i$, $\Delta B_i = B_{i+1} - B_i$, and $$B_i = n_i^{TM} - n_i^{TE} \tag{8}$$

or equivalently $$B_i L_i = \int_0^{L_i} B_{z,i} dz_i \tag{9}$$

where $$B_{z,i} = n_{z,i}^{TM} - n_{z,i}^{TE} \tag{10}$$

In one variation of the inventive AWG, the AWG satisfies equation 7.

Eq. 7 does not necessarily fully specify the design of the AWG. A typical additional constraining equation may be expressed as $L_i \Delta n_i + n_i \Delta L_i = \Psi_i$ so that the pair of equations that define the AWG is given by $$L_i \Delta B_i + B_i \Delta L_i = \Phi_i \tag{11a}$$

$$L_i \Delta n_i + n_i \Delta L_i = \Psi_i \tag{11b}$$

where $2n_i = n_i^{TM} + n_i^{TE}$, $\Delta n_i = n_{i+1} - n_i$, and $\Psi_i$ may represent any number of expressions. Typically, $$\Psi_i = m \lambda_0 \tag{12}$$

where m is the grating order of the AWGR is 10 and is an optical wavelength that is typically the mean of the optical wavelengths that are intended to be transmitted from one of the input ports to one of the output ports of the AWGR. An example of an alternative expression for $\Psi_i$ is $$\Psi_i = \begin{cases} m\lambda_0 \ldots & \text{for odd } i \\ (m+1/2)\lambda_0 \ldots & \text{for even } i \end{cases} \tag{13}$$

The above expression of $\Psi_i$ provides for an AWGR with a passband that is wider than the passband of a Gaussian AWGR. U.S. Pat. No. 5,467,418 (C. Dragone) discloses other choices for $\Psi_i$ that also provides for a passband that is wider than the passband of a Gaussian AWGR. In one variation of the inventive AWG, the AWG satisfies equations 7 and 11. In the preferred variation, the values of $B_i$ and $n_i$ may be adjusted to the desired values by adjusting the values of $w_i$ where $w_i$ are the values of the average widths of the waveguides, and where the average is taken along the length of the waveguides between curve A and curve B. Mathematically the average width along a waveguide $w_i$ and the standard deviation of the width along a waveguide $\sigma_i$ may be defined herein as $$w_i L_i = \int_0^{L_i} w_{z,i} dz_i \tag{14}$$

$$\sigma_i^2 L_i = \int_0^{L_i} (w_{z,i} - w_i)^2 dz_i$$

where $w_{z,i}$ is the width of the ith waveguide at a distance z along the waveguide from curve A towards curve B. $B_i$ and $n_i$ may be substantially varied by changing the width of the waveguide, which is not obvious in the prior art. That $B_i$ and $n_i$ may be varied by the required amount is discussed in further detail below.

For illustrative purposes only, the equations 7 and 11 are expressed below in an approximate manner such that the dependence of $n_i$ and $B_i$ is made explicit.

$$L_i \left( \frac{dB_i}{dw} \right) \Delta w + B_i \Delta L_i = \Phi_i \tag{15}$$

$$L_i \left( \frac{dn_i}{dw} \right) \Delta w + n_i \Delta L_i = \Psi_i$$

In Eq. 15 it is implicit that the derivatives are evaluated at $w = w_i$. Eq. 15 is accurate to the extent that $n_i$ and $B_i$ have a linear dependence on w. Again for illustrative purposes only, Eq. 15 can be expressed as $$L_i \left( \frac{dB_{z,i}}{dw_z} \right) \Delta w + B_i \Delta L_i = \Phi_i \tag{16}$$

$$L_i \left( \frac{dn_{z,i}}{dw_z} \right) \Delta w + n_i \Delta L_i = \Psi_i$$

provided that $$\left(\frac{dB_{z,i}}{dw_z}\right) = \left(\frac{dB_i}{dw}\right) \text{ and } \left(\frac{dn_{z,i}}{dw_z}\right) = \left(\frac{dn_i}{dw}\right),$$

i.e., provided that $B_{z,i}$ and $n_{z,i}$ are linearly depend on $w_z$ within the range of values for $w_z$ that are used in the waveguides. In Eq. 16 it is implicit that the derivatives are evaluated at $w_z=w_{z,i}$. The values of $w_i$ and $L_i$ for all the waveguides of the AWG can be determined from Eqs. 15 as follows. Values of $\Phi_i$ and $\Psi_i$ are assumed to be known as part of the design criteria. Values of $w_1$ and $L_1$ are chosen. Then the values of $n_i$, $B_i$, and their derivatives are evaluated for a width equal to $w_1$. Eqs. 15 are then applied to determine $w_2$ and $L_2$. The process is iterated to find all the values of $w_i$ and $L_i$ for $i=2, \ldots N$. Alternatively, Eqs. 16 may be applied in the same manner.

For illustrative purposes only, it is shown below that a closed form solution for $\Delta w_i$ and $\Delta L_i$ may be obtained provided that $\Delta L_i$ is independent of i.

$$-\left(n_i \frac{dB_i}{dw} - B_i \frac{dn_i}{dw}\right)\Delta L = \Phi_i \frac{dn_i}{dw} - \Psi_i \frac{dB_i}{dw} \quad (17)$$

$$-L_i\left(n_i \frac{dB_i}{dw} - B_i \frac{dn_i}{dw}\right)\Delta w_i = B_i\Psi_i - n_i\Phi_i$$

The subscript on $\Delta L_i$ has been omitted to indicate that $\Delta L_i$ does not have a dependence on i in Eq. 17. As a typical example, it is further assumed that $\Phi_i=0$ and $\Psi_i=m\lambda_0$, then Eq. 17 may be expressed as $$-\left(n_i \frac{dB_i}{dw} - B_i \frac{dn_i}{dw}\right)\Delta L = -m\lambda_0 \frac{dB_i}{dw} \quad (18)$$

$$-L_i\left(n_i \frac{dB_i}{dw} - B_i \frac{dn_i}{dw}\right)\Delta w_i = m\lambda_0 B_i$$

One result that follows from Eq. 18 is $$(dB_i/dw)\Delta w_i = -B_i\Delta L/L_i \quad (19)$$

Typically, $(dB_i/dw)/B_i$ is positive; hence it is preferred to arrange the average widths of the waveguides of the AWG such that the shortest waveguide is, on average, the widest and that the longest waveguide is, on average, the narrowest. Since $B_i$ varies slightly as $w_i$ changes, Eq. 19 suggests that variation for which $\Delta L_i$ is constant and $\Phi_i=0$ and $\Psi_i=m\lambda_0$ it is preferred to have waveguides with widths $w_i$ that vary according to the number of the waveguide i in a manner that is slightly nonlinear.

The average widths of the waveguides of the AWG can be determined from either Eqs. 11, Eqs. 15, Eqs. 16, Eqs. 17, or Eqs. 18. For any particular waveguide that is required to have a particular average width, a number of variations are possible.

FIRST EXAMPLE

In one example, which is illustrated in FIGS.. 3A and 3B, the width of the waveguide may have a constant value throughout the entire length of the waveguide between the two planar waveguides, i.e., the width of the waveguide for any cross-section has a value that is equal to the required average value. In this variation, the standard deviation in width along each waveguide is substantially equal to zero. Typically, the values of optical path length that are used in the design calculations are based on the optical path lengths curve A 84 located at the juncture between the AWG region 66 and the input planar waveguide 64 and curve B 86 located at the juncture between the AWG region 66 and the output planar waveguide 68.

SECOND EXAMPLE

Figure 6:
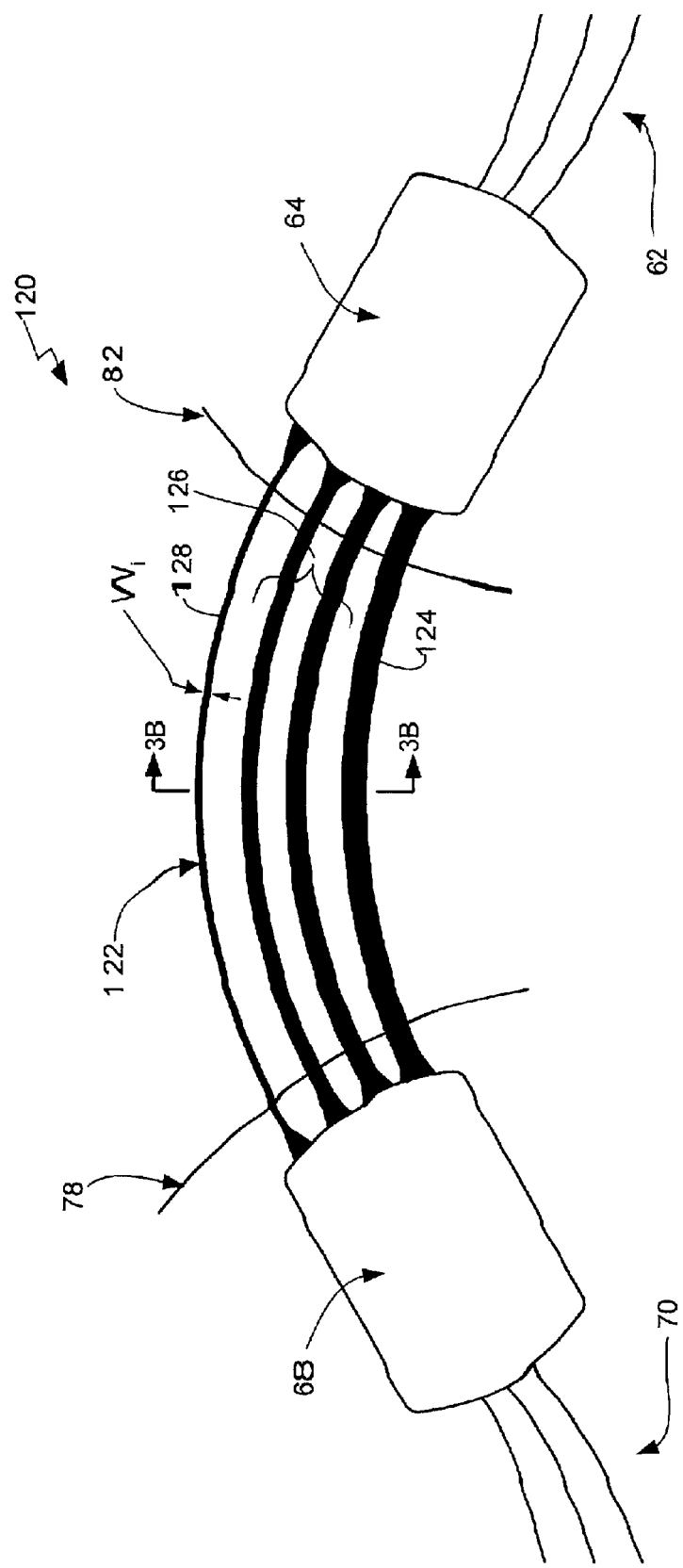
FIG. 6 schematically depicts another variation of an AWGR. In this variation, the width of each waveguide varies only in the taper region.

In a second example, which is illustrated in FIG. 6, each waveguide of the AWG preferably has a constant width throughout the length of the waveguide except for a taper region where the AWG waveguide couples to the input planar waveguide (herein referred to as the "AWG input taper") and for a taper region where the AWG waveguide couples to the output planar waveguide (herein referred to as the "AWG output taper"). The variation 120 is similar to that shown in FIG. 3A in that grating 122 depicts first, intermediate, and Nth waveguides 124, 126, 128, respectively. Also, a cross-sectional view 3B—3B of waveguides 122 is shown similar to FIG. 3B. However, in FIG. 6, the AWG input taper is between the input planar waveguide 64 and curve A 82, and the AWG output taper is between the output planar waveguide 68 and curve B 78. In this variation, it is preferred that each AWG input taper have a length that is substantially equal to the length of all other AWG input tapers and that each AWG output taper have a length that is substantially equal to the length of all other AWG output tapers. In this variation, it is further preferred that each AWG input taper have values of effective index= $n_{z,i}^{TM}-n_{z,i}^{TE}$ that vary linearly throughout the taper region according to the mathematical functions $$n_{z,i}^{TE}=n_i^{TE}+(n_I^{TE}-n_i)z/L_I \quad (20a)$$

$$n_{z,i}^{TM}=n_i^{TM}+(n_I^{TM}-n_i)z/L_I \quad (20b)$$

where z is the distance along the waveguide from curve A towards the input planar waveguide and that each AWG output taper have values of effective index $n_{z,i}^{TM}$ and $n_{z,i}^{TE}$ that vary linearly throughout the taper region according to the mathematical functions $$n_{z,i}^{TE}=n_i^{TE}+(n_O^{TE}-n_i)z/L_O \quad (21a)$$

$$n_{z,i}^{TM}=n_i^{TM}+(n_O^{TM}-n_i)z/L_O \quad (21b)$$

where z is the distance along the waveguide from curve A towards the input planar waveguide. Provided that $n_{z,i}^{TM}$ and $n_{z,i}^{TE}$ vary linearly with the width of the waveguide, Eqs. 20 and 21 are satisfied by a linear taper design. If Eq. 20 is satisfied, then $OPL_i^{TE}$ and $OPL_i^{TM}$ may be given by $$OPL_i^{TE}=(L_I n_I^{TE}+L_O n_O^{TE})/2+L_i n_i^{TE} \quad (22a)$$

$$OPL_i^{TM}=(L_I n_{ITM}+L_O n_O^{TM})/2+L_i n_i^{TM} \quad (22b)$$

where $n_i^{TM}$ and $n_i^{TM}$ now refers to the effective index values of the waveguide averaged over the section of the waveguide that excludes the tapers and Li refers to the length along the waveguide from the midpoint of the input taper to the midpoint of the output taper. Applying Eq. 22, yields the result $$L_i\Delta n_i+n_i\Delta L_i=\Psi_I \quad (23a)$$

which is the same as Eq. 11b, except that n, now refers to an effective index value of the waveguide averaged over the section of the waveguide that excludes the tapers. Similarly, the following result may be obtained $$L_i\Delta B_i+B_i\Delta L_i=\Phi_i \quad (23b)$$

which is similar to Eq 11a, except that in Eq. 23a, Bi refers to the value of birefringence averaged over the section of the waveguide that excludes the tapers. Since Eq. 23 is formally equivalent to Eq. 11, the equations above that are derived from Eq. 11 may apply to this variation provided the modified interpretation of $L_i$, $n_i$ and $B_i$ are used.

Experimental Results of the Second Example

To demonstrate the utility of the present invention, a first group of AWGRs were fabricated that were based on the variation of FIG. 6 and a second group of additional conventional AWGRs were fabricated (referred to herein as the control group). The control group was similar in design to the first group except that all waveguides of the AWG had the same width. Three input waveguides were tested for each AWGR of each group. In both groups, 197 waveguides were used in the AWG. In the first group, the range of waveguide widths, i.e., value of $|w_N-w_1|$ was between 1 μm and 3 μm and the value of $w_N+w_1$ was between 15 μm and 18 μm. In the control group, the value of $|w_N-w_1|$ was less than 0.4 μm and the value of $w_N+w_1$ was between 15 μm and 18 μm. Three inputs were tested for each AWGR. At least 40 outputs were tested for each input waveguide of each AWGR. For the control group, the average value of PDD was 0.10 nm and the standard deviation of the values of PDD was 0.02 nm.

Figure 7A:
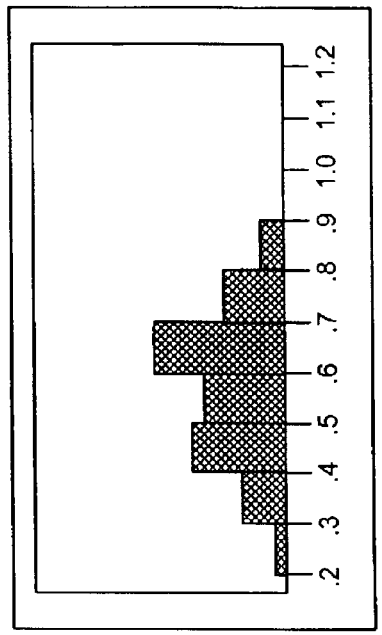
FIG. 7A shows the distribution of PDD for a control group.
Figure 7C:
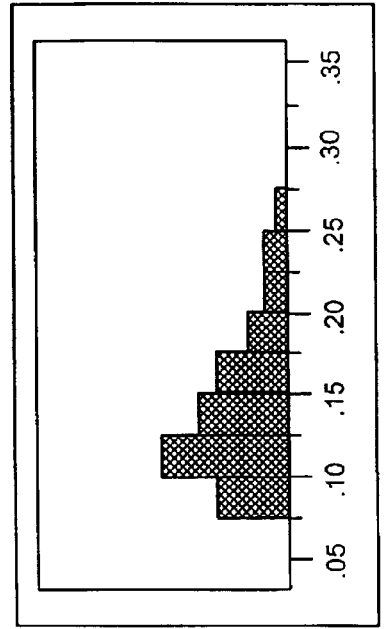
FIG. 7C shows the distribution of PDL for the control group.

The distribution of the measured values of PDD and PDL for the control group is shown in FIGS. 7A and 7C, respectively. For the control group, the average value of PDL was 0.58 dB and the standard deviation of the PDL values was 0.14 dB. For the first group, the average value of PDD was 0.00 nm and the standard deviation of the values of PDD was 0.02 nm. For the control group, the average value of PDL was 0.15 dB and the standard deviation of the PDL values was 0.05 dB.

Figure 7B:
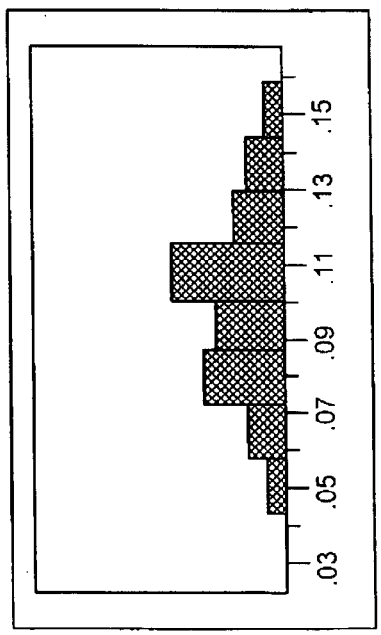
FIG. 7B shows the distribution of PDD for a first group.
Figure 7D:
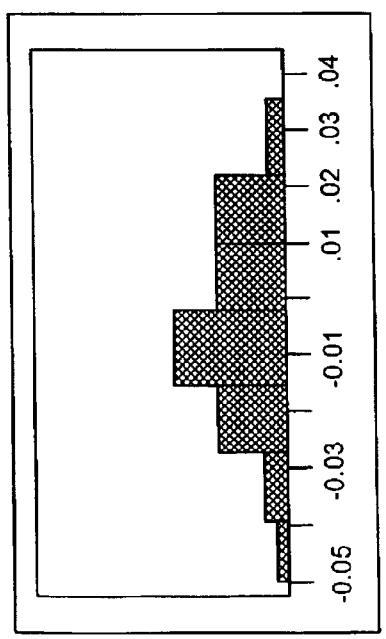
FIG. 7D shows the distribution of PDL for the first group.
Figure 8A:
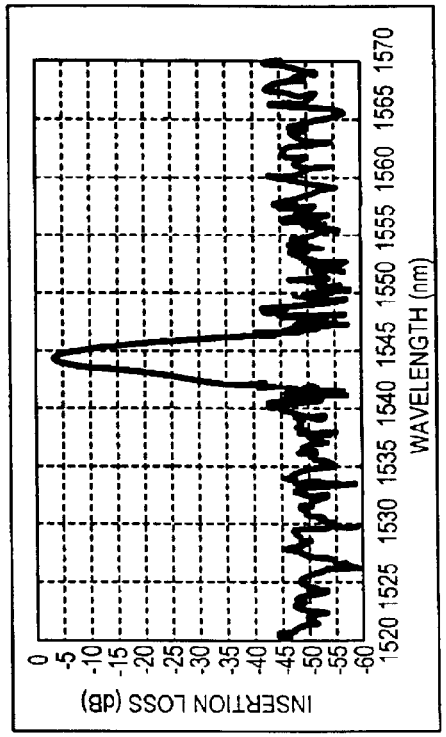
FIG. 8A shows the spectral transmissivity of a first AWGR from the control group.
Figure 8B:
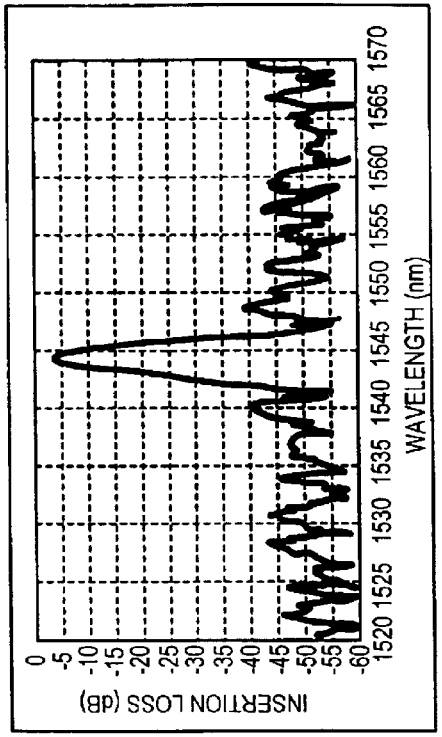
FIG. 8B shows the spectral transmissivity of a second AWGR from the control group.
Figure 8C:
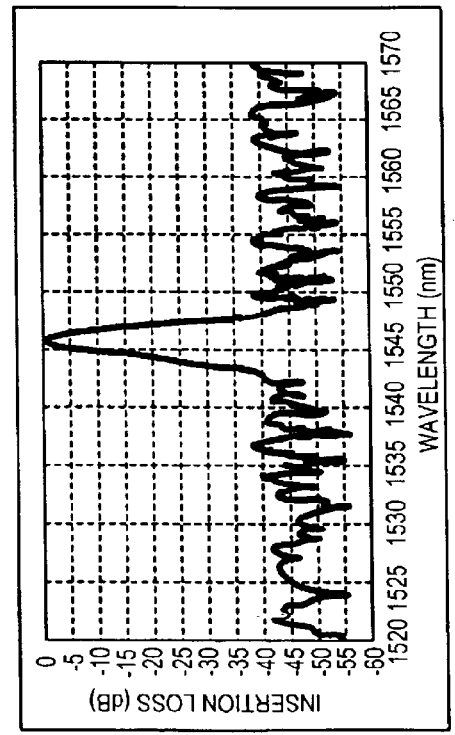
FIG. 8C shows the spectral transmissivity of a first AWGR from the first group.
Figure 8D:
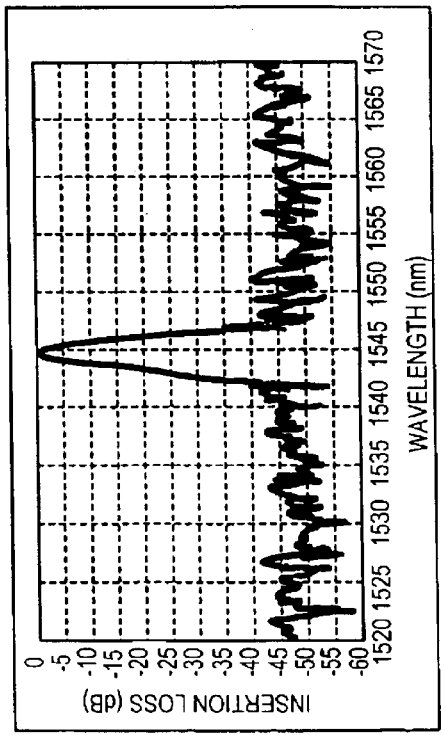
FIG. 8D shows the spectral transmissivity of a second AWGR from the first group.
Figure 9A:
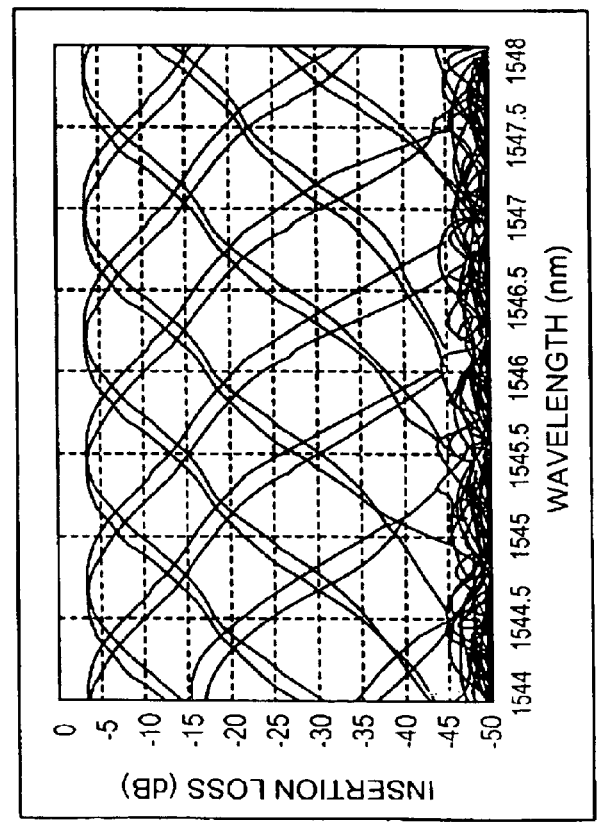
FIG. 9A shows the spectral transmissivity curves for several output ports of one AWGR of the control group.
Figure 9B:
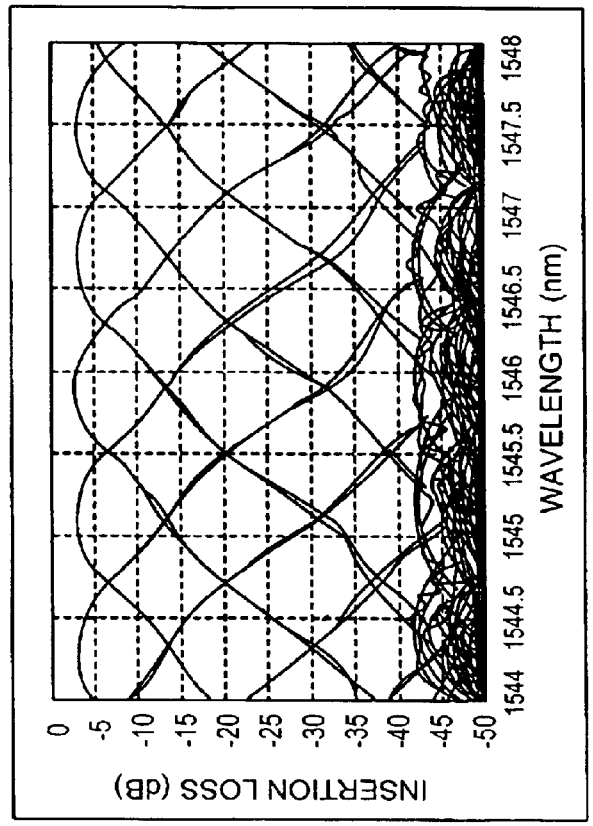
FIG. 9B shows the spectral transmissivity curves for several output ports of one AWGR of the first group.

The distribution of the measured values of PDD and PDL for the first group is shown in FIGS. 7B and 7D respectively. Applying a typical device requirement of 0.05 nm for the maximum value of PDD, the control group on average fails to meet the required value of PDW and the first group successfully meets the required value of PDW. Furthermore, the application of the invention does not substantially degrade the noise floor of the spectral transmissivity. This may be evident by the comparison of FIG. 8A against FIG. 8C and by the comparison of FIG. 8B against FIG. 8D. FIGS. 8A and 8B depict the measured spectral transmissivities for two AWGRs of the control group and FIGS. 8C and 8D show two AWGRs of the first group. Further comparison between an AWGR of the first group and an AWGR of the control group may be provided by FIGS. 9A and 9B. FIG. 9A depicts the spectral transmissivity curves of several adjacent output waveguides of one AWGR of the control group. FIG. 9B depicts the spectral transmissivity curves of several adjacent output waveguides of one AWGR of the first group. The PDW of the AWGR from the first group is shown to be smaller than the PDW of the AWGR of the control group. Also, the passband shape is not substantially changed by the application of the invention.

THIRD EXAMPLE

Figure 10:
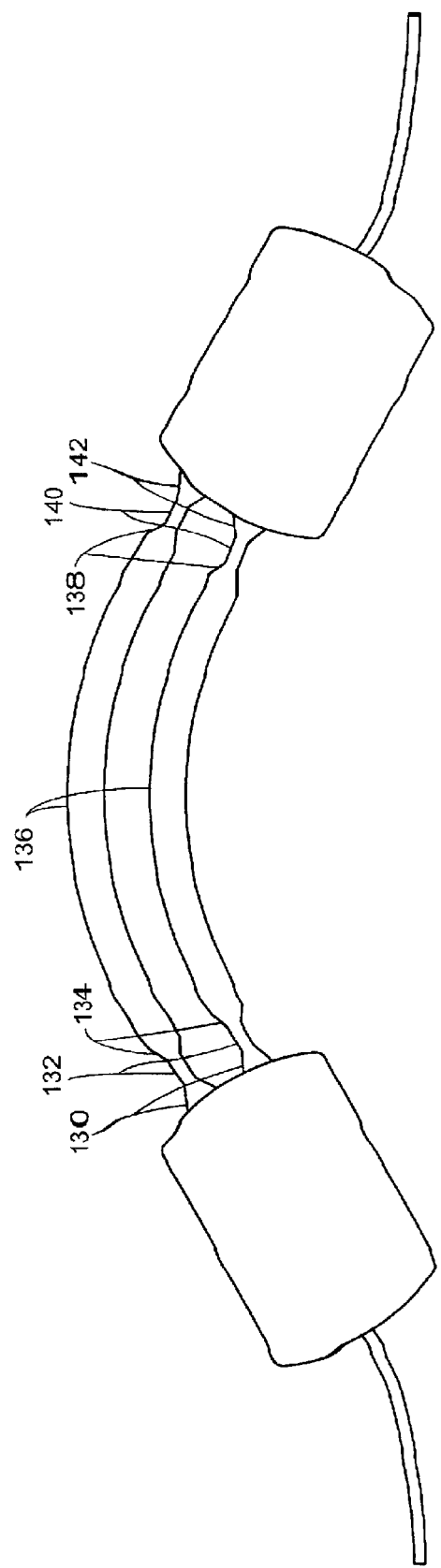
FIG. 10 schematically depicts another variation of an AWGR.

In a third example, illustrated in FIG. 10, each waveguide of the AWG may comprise about seven segments 130, 132, 134, 136, 138, 140, 142. Segments 130, 134, 138, 142 are taper segments in which the width of the waveguide preferably changes and segments 132, 136, 140 are segments in which the width of the waveguide preferably does not change. Segments 130 and 142 are located in a region of the AWG where the optical coupling between adjacent waveguide may be very strong. Segments 134, 136, 138 may be located in a region of the AWG where the optical coupling between adjacent waveguides may be very weak. The width at each end of segment 130 and the length of segment 130 is preferably the same for all waveguides, consequently, the OPL of segment 130 may be the same for all waveguides. Similarly, the width at each end of segment 142 and the length of segment 142 is preferably the same for all waveguides, consequently, the OPL of segment 142 may be the same for all waveguides. Similarly, the width and length of segment 132 is preferably the same for all waveguides, consequently, the OPL of segment 132 may be the same for all waveguides. Similarly, the width and length of segment 140 is preferably the same for all waveguides, consequently, the OPL of segment 140 may be the same for all waveguides. Consequently, segments 130, 132, 140, 142 may be excluded from the evaluation of the OPLs that enter into Eq. 4 and all equations derived from Eq. 4 without affecting the validity of Eq. 4 as the criterion for zero PDW. This variation is preferable if the evaluation of the input and output tapers of the second embodiment have OPLs that are different from one another and if the coupling between segments makes it difficult to evaluate the values of OPL in this region.

FOURTH EXAMPLE

Figure 11:
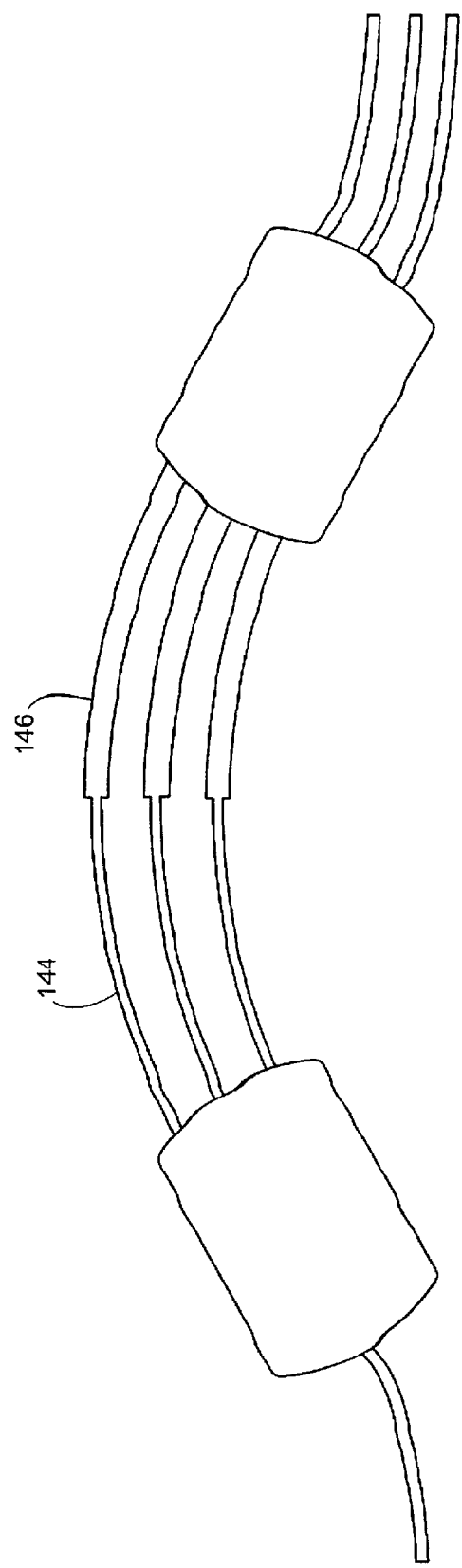
FIG. 11 schematically depicts another variation of an AWGR.

In a fourth example, which is illustrated in FIG. 11, the ith waveguide may comprise two segments, a first segment 144 of width $w_A$ and length $L_{A,i}$ and a second segment 146 of width $W_B$ and length $L_{B,i}$. Because each segment may have a different width, each segment may consequently have a different effective index and birefringence. The average width, average effective index and average birefringence may be given by $$w_i L_i = w_A L_{A,i} + w_B L_{B,i}$$

$$n_i L_i = n_A L_{A,i} + n_B L_{B,i}$$

$$B_i L_i = B_A L_{A,i} + B_B L_{B,i}$$

the average values of width, effective index and birefringence, in this variation preferably depend on i since $L_{A,i}$ and $L_{B,i}$ depend on i. Using the average values expressed above in Eq. 11 yields the following result $$B_A \Delta L_{A,i} + B_B \Delta L_{B,i} = \Phi_i \tag{24a}$$

$$n_A \Delta L_{A,i} + n_B \Delta L_{B,i} = \Psi_i \tag{24b}$$

where $n_A$ and $n_B$ are the effective index values of first and second segments 144, 146, respectively, and $B_A$ and $B_B$ are the birefringence values for first and second segments 144, 146, respectively. All the values of $L_{A,i}$ and $L_{B,i}$ may be found in the following manner. $L_{A,1}$ and $L_{B,1}$ are chosen. The values of $n_A$, $n_B$, $B_A$, and $B_B$ may be determined from the waveguide structure of the respective segment. Eq. 24 may be applied to determine $L_{A,2}$ and $L_{B,2}$. Eq. 24 may then be applied iteratively until $L_{A,1}$ and $L_{B,1}$ values are found for i=2, ... N.

FIFTH EXAMPLE

Figure 12:
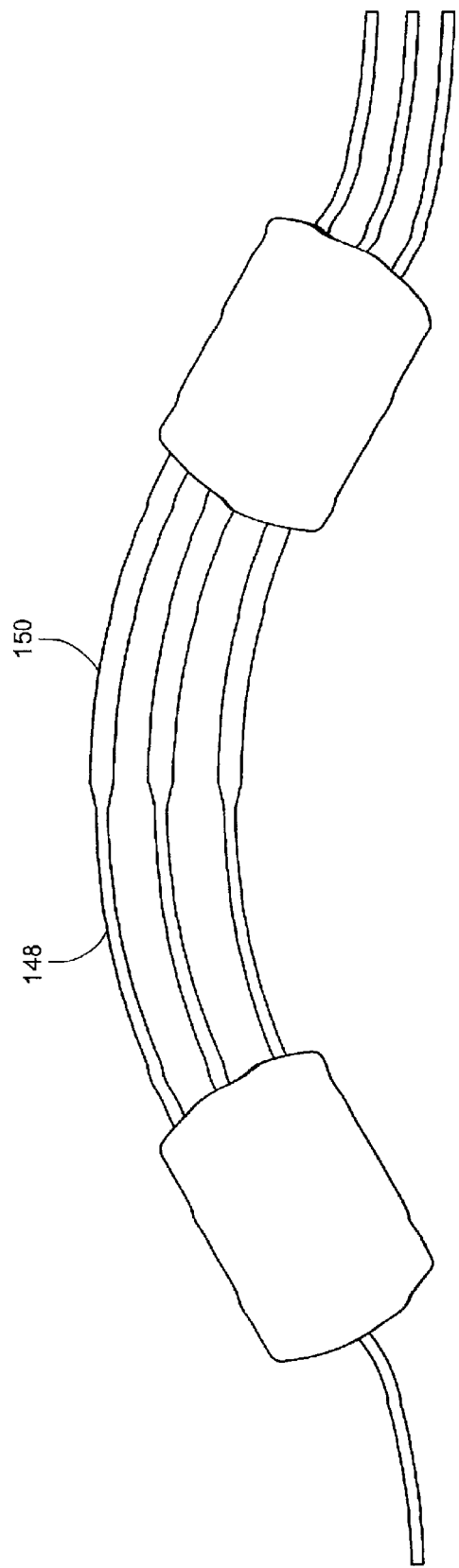
FIG. 12 schematically depicts another variation of an AWGR.

A fifth example is illustrated in FIG. 12. This example is similar to the third example, except that tapers are used on each waveguide between first segment 148 and second segment 150. In this example, the taper design may be the same on all waveguides; therefore, the taper between segment A and segment B of each waveguide may be excluded from the evaluation of the OPL of each waveguide when applying Eq. 4 or any of the equations derived from it.

SIXTH EXAMPLE

Figure 13:
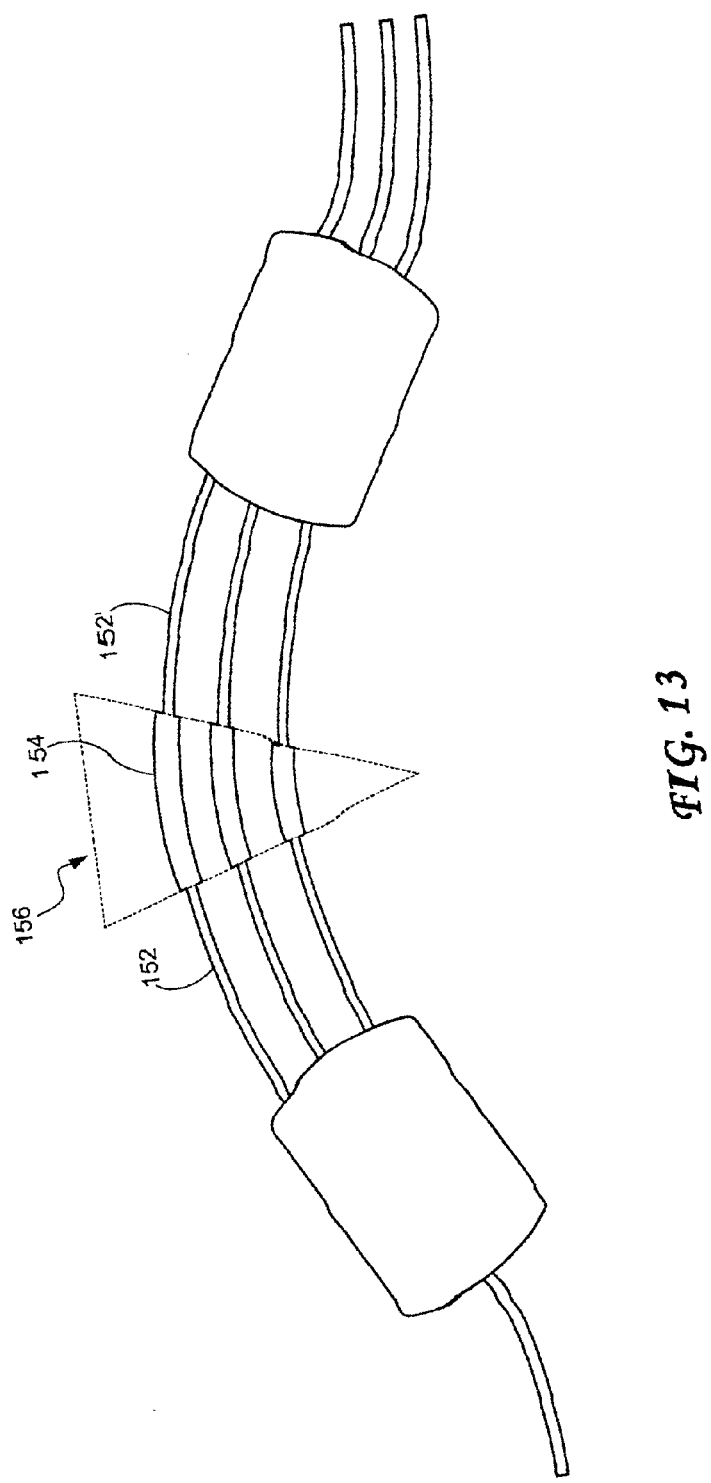
FIG. 13 schematically depicts another variation of an AWGR.

A sixth example is illustrated in FIG. 13. In this example, the ith waveguide may comprise three segments, a central segment 154 and two flanking segments 152, 152'. A first flanking segment 152 preferably has a birefringence equal to that to the second flanking segment 152'. The central segment 154 may have a birefringence that is different from the flanking segments 152, 152'. The boundary around the central waveguide segments 156 preferably defines a region that is referred to herein as a "patch." Such patches may typically be placed symmetrically about a midpoint of the relevant waveguides although the patches may individually be positioned anywhere along the waveguides. By selecting lengths of the segments that are appropriate to values of birefringence of the segments, an AWGR may be realized with a small value for PDW. The three segments 152, 154, 152' may have widths $w_A$, $w_B$, and $w_A$, respectively, i.e., segments 152 and 152' may have equal widths. Eq. 24 may be applied to this example provided that $L_{Ai}$ is interpreted and the length of segment 152 plus the length of segment 152'. The number of waveguides and widths depicted here is merely exemplary and is not meant to limit the scope of this invention. Any number of waveguides, widths, and any number of patches having variable widths may be utilized depending upon the desired application and remains within the scope of this invention.

SEVENTH EXAMPLE

Figure 14:
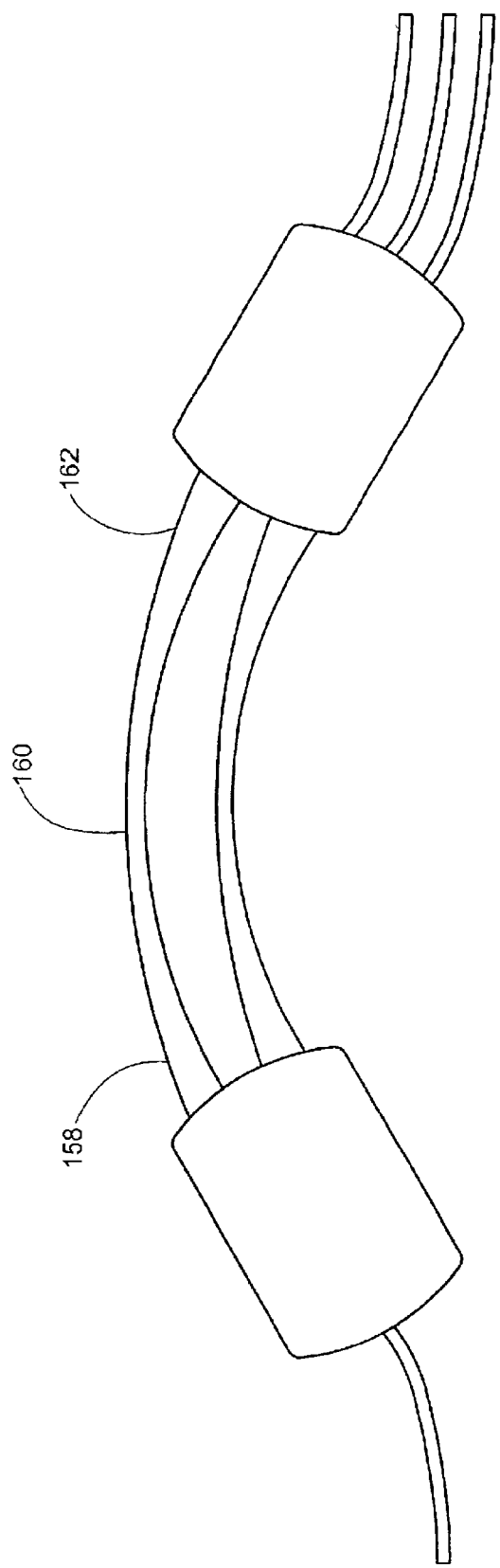
FIG. 14 schematically depicts another variation of an AWGR.

A seventh example is illustrated in FIG. 14. In this example, each waveguide of the AWG preferably has a width that continuously changes in an arc-like manner such that the waveguide may have a certain width at segment 158. The width then preferably tapers in a gentle arc to a thinner segment 160; and the waveguide then tapers gently to a width at segment 162, preferably similar to segment 158.

Although the present invention has been described with reference to particular variations, the description is only an example of the invention's application and should not be taken as a limitation. Various adaptations and combinations of features of the variations disclosed are now readily apparent to those of ordinary skill and are within the scope of the invention.

I claim:

1. An arrayed waveguide grating comprising:
   at least a first waveguide having a first width and a first length;
   a second waveguide having a second width different from the first width and a second length different from the first length;
   at least one input waveguide; and
   an input slab waveguide optically coupled to the input waveguide, wherein the arrayed waveguide grating is optically coupled to the input slab waveguide/an output slab waveguide optically coupled to the input slab waveguide via the arrayed waveguide grating; and at least one output waveguide optically coupled to the output slab waveguide.

2. The arrayed waveguide grating of claim 1 wherein the first waveguide comprises an average width which is different from an average width of the second waveguide.

3. The arrayed waveguide grating of claim 1 wherein the first width is constant along the length of the first waveguide, and the second width is constant along the length of the second waveguide.

4. The arrayed waveguide grating of claim 1 wherein the first waveguide and the second waveguide each comprise a tapered first end and a tapered second end and an intermediate segment therebetween, wherein the intermediate segment of the first waveguide comprises an average width which is constant along a length of the first waveguide and which is different from an average width of the intermediate segment of the second waveguide.

5. The arrayed waveguide grating of claims 4 or 7 wherein the first tapered end and the second tapered end comprises a length less than about 1 mm.

6. The arrayed waveguide grating of claim 1 wherein the first waveguide comprises an average width which is different from an average width of the second waveguide such that a standard deviation of a width along a length of the first waveguide divided by the average width of the first waveguide is less than about 0.1, and a standard deviation of a width along a length of the second waveguide divided by the average width of the second waveguide is less than about 0.1.

7. The arrayed waveguide grating of claim 1 wherein the first waveguide and the second waveguide each comprise a tapered first end and a tapered second end and an intermediate segment therebetween, wherein an average width of the intermediate segment of the first waveguide is different from an average width of the intermediate segment of the second waveguide,
   such that a standard deviation of a width along a length of the intermediate segment of the first waveguide divided by the average width of the first waveguide is less than about 0.1, and a standard deviation of a width along a length of the intermediate segment of the second waveguide divided by the average width of the second waveguide is less than about 0.1.

8. The arrayed waveguide grating of claim 1 wherein each of the waveguides in the arrayed waveguide grating comprise buried channel waveguides.

9. The arrayed waveguide grating of claim 8 wherein the buried channel waveguides comprise silica.

10. The arrayed waveguide grating of claim 1 wherein each of the waveguides in the arrayed waveguide grating comprise silica.

11. The arrayed waveguide grating of any of claims 1 or 3–10 wherein each of the widths of the waveguides in the arrayed waveguide grating is configured to provide a predetermined polarization dependent wavelength.

12. The arrayed waveguide grating of any of claims 1 or 3–10 wherein the waveguides in the arrayed waveguide grating are configured according to Eq. 11a.

13. The arrayed waveguide grating of claim 12 wherein $\Phi_i=0$ in Eq. 11a.

14. The arrayed waveguide grating of claim 13 wherein a variation of average birefringence is caused by a variation in an average width of the waveguides in the arrayed waveguide grating.

15. The arrayed waveguide grating of claim 12 wherein a variation of average birefringence is caused by a variation in an average width of the waveguides in the arrayed waveguide grating.

16. The arrayed waveguide grating of claim 12 wherein a variable $L_i$ in Eq. 11a comprises non-tapered segments.

17. The arrayed waveguide grating of any of claims 1 or 3–10 wherein a value of $|w_N-w_1|$ is between about 0.5 µm and about 5 µm.

18. The arrayed waveguide grating of any of claims 3–7 wherein the waveguides in the arrayed waveguide grating comprise buried channel waveguides.

19. The arrayed waveguide grating of claim 18 wherein the buried channel waveguides comprise silica.

20. The arrayed waveguide grating of any of claims 3–7 wherein the waveguides in the arrayed waveguide grating comprise silica.

* * * * *